United States Patent
Schwarz et al.

(10) Patent No.: US 8,599,958 B2
(45) Date of Patent: Dec. 3, 2013

(54) ULTRA-HIGH-BANDWIDTH LOW-POWER-CONSUMPTION WIRELESS COMMUNICATION SYSTEMS

(75) Inventors: Baruch Schwarz, Raanana (IL); Izhak Kirshenbaum, Rosh HaAyin (IL); Yigal Leiba, Holon (IL)

(73) Assignee: Siklu Communication Ltd., Petach-Tikva (IL)

( * ) Notice: Subject to any disclaimer, the term of this patent is extended or adjusted under 35 U.S.C. 154(b) by 347 days.

(21) Appl. No.: 12/892,944

(22) Filed: Sep. 29, 2010

(65) Prior Publication Data
US 2012/0076224 A1    Mar. 29, 2012

(51) Int. Cl.
    *H04L 27/00* (2006.01)
(52) U.S. Cl.
    USPC .......... 375/295; 375/146; 455/13.4; 455/574; 455/127.5
(58) Field of Classification Search
    USPC .......... 375/146, 141, 295, 297, 261; 455/13.4, 455/25, 574, 91, 115.1, 115.3, 115.4, 121, 455/127.1, 127.5, 129
    See application file for complete search history.

(56) References Cited

U.S. PATENT DOCUMENTS

| | | | |
|---|---|---|---|
| 7,415,085 B2 | 8/2008 | Fujii et al. | |
| 7,499,509 B2 | 3/2009 | Zhidkov | |
| 7,508,898 B2 | 3/2009 | Cyr et al. | |
| 2002/0067711 A1* | 6/2002 | Kobayashi | 370/338 |
| 2003/0022694 A1 | 1/2003 | Olsen et al. | |
| 2005/0135457 A1 | 6/2005 | Molisch et al. | |
| 2008/0153549 A1* | 6/2008 | Korevaar et al. | 455/561 |
| 2009/0213901 A1 | 8/2009 | Berens | |
| 2009/0282315 A1 | 11/2009 | Trachewsky et al. | |
| 2010/0158154 A1* | 6/2010 | Kang et al. | 375/296 |
| 2010/0226304 A1 | 9/2010 | Shoji | |
| 2011/0075713 A1* | 3/2011 | Lovberg et al. | 375/219 |
| 2011/0207425 A1* | 8/2011 | Juntunen et al. | 455/293 |
| 2011/0268216 A1* | 11/2011 | Rozenblit et al. | 375/295 |

\* cited by examiner

*Primary Examiner* — Dac Ha

(57) ABSTRACT

An ultra-high-bandwidth low-power-consumption wireless communication system includes (i) a Radio Frequency Integrated Circuit (RFIC) comprising a radio transmitter, transmitting millimeter-wave signals. The radio transmitter includes a Power Amplifier (PA) outputting the millimeter-wave signals at a low power level of between −10 dBm and 20 dBm, and by that allowing inclusion of the PA in the RFIC. The radio transmitter further includes a Voltage Controlled Oscillator (VCO) and a synthesizer driving a mixer up-converting signals into the millimeter-wave signals. The VCO and synthesizer have a combined phase noise between a first level and a second level, wherein the first level is high enough to allow inclusion of the VCO and synthesizer in the RFIC, and the second level is low enough to facilitate transmitting at 16-levels Quadrature-Amplitude-Modulation (16QAM).

27 Claims, 10 Drawing Sheets

ULTRA-HIGH-BANDWIDTH LOW-POWER-CONSUMPTION WIRELESS COMMUNICATION SYSTEMS

TECHNICAL FIELD

Some of the disclosed embodiments relate to wireless communication systems, and more specifically to ultra-high-bandwidth low-power-consumption wireless communication systems.

BACKGROUND

Fixed wireless networks transmit data point-to-point through the air over a terrestrial microwave platform rather than through copper or optical fiber and typically use a directional radio antenna on each end of a wireless link. These antennas are designed for outside use and to accommodate various weather conditions, distances and bandwidths. They are usually selected to make the beam as narrow as possible and thus focus transmit power to their destination, increasing reliability and reducing the chance of eavesdropping or data injection. The links are usually arranged as a point-to-point setup to permit the use of these antennas. Radio transmitters associated with fixed wireless networks usually transmit data at high rates, resulting in high power consumption.

SUMMARY

In one embodiment, an ultra-high-bandwidth low-power-consumption wireless communication system includes (i) a Radio Frequency Integrated Circuit (RFIC) comprising a radio transmitter, transmitting millimeter-wave signals. The radio transmitter includes a Power Amplifier (PA) outputting the millimeter-wave signals at a low power level of between −10 dBm and 20 dBm, and by that allowing inclusion of the PA in the RFIC. The radio transmitter further includes a Voltage Controlled Oscillator (VCO) and a synthesizer driving a mixer up-converting signals into the millimeter-wave signals. The VCO and synthesizer have a combined phase noise between a first level and a second level, wherein the first level is high enough to allow inclusion of the VCO and synthesizer in the RFIC, and the second level is low enough to facilitate transmitting at 16-levels Quadrature-Amplitude-Modulation (16 QAM), (ii) a radio receiver receiving the millimeter-wave signals, and (iii) a first directional antenna and a second directional antenna separated by at least 100 meters of line of sight and directed towards each other, together having an aggregated gain of more than 60 dBi, the first directional antenna transmitting the millimeter-wave signals, and the second directional antenna receiving the millimeter-wave signals and feeding the millimeter-wave signals to the radio receiver. The aggregated gain concentrates the low power level of the PA. The radio transmitter and the radio receiver form a millimeter-wave communication link at a bandwidth of at least 100 MHz and using 16 QAM, over distances of more than 100 meters, resulting in data transfer rate of at least 200 Mbps, while the RFIC, the first directional antenna, and the second directional antenna keep the power consumption of the radio transmitter under 2.5 W.

In one embodiment, the millimeter-wave signals are located above 20 GHz. In one embodiment, the millimeter-wave signals are located above 50 GHz. In one embodiment, the millimeter-wave signals are located above 57 GHz. In one embodiment, the radio transmitter and the radio receiver form a millimeter-wave communication link at a bandwidth of at least 200 MHz and 16 QAM, over distances of more than 100 meters, resulting in data transfer rate of at least 400 Mbps. In one embodiment, the radio transmitter and the radio receiver form a millimeter-wave communication link at a bandwidth of at least 500 MHz and 16 QAM, over distances of more than 100 meters, resulting in data transfer rate of at least 1 Gbps.

In one embodiment, the first level high enough to allow inclusion of the VCO and synthesizer in the RFIC is −25 dBc. In one embodiment, the millimeter-wave signals convey a baseband Orthogonal Frequency Division Multiplexing (OFDM) signal having sub-carrier frequency separation equal to X MHz, the combined phase noise is measured by integrating twice a combined phase noise density over a range starting at X MHz above a frequency of a carrier and up to the at least 100 Mhz above the frequency of the carrier, and the second level low enough to facilitate transmitting at 16-levels Quadrature-Amplitude-Modulation (16 QAM) is −15 dBc.

In one embodiment, the ultra-high-bandwidth low-power-consumption wireless communication system further includes electrical components comprising a network enabled processor, a modulator, and a Power Over Ethernet (PoE) interface. The a Power Over Ethernet (PoE) interface is operative to deliver power to the RFIC and the electrical components. In one embodiment, the electrical components have a power consumption of under 23 W, such that the aggregated power consumption of the RFIC and the electrical components is under 25.5 W. In one embodiment, the electrical components have a power consumption of under 10.45 W, such that the aggregated power consumption of the RFIC and the electrical components is under 12.95 W. In one embodiment, the electrical components have a power consumption of under 3.99 W, such that the aggregated power consumption of the RFIC and the electrical components is under 6.49 W.

In one embodiment, a backhaul unit includes the electrical components and the RFIC. The electrical components include a Power Over Ethernet (PoE) interface, and the PoE interface is configured to deliver power to the RFIC and the electrical components. A Base-Station belonging to a Radio Access Network (RAN) is configured to drive the PoE interface. In one embodiment, the RFIC is a Silicon-Germanium (SiGe) RFIC comprising high frequency Heterojunction Bipolar Transistors (HBT). In one embodiment, the RFIC is a CMOS RFIC.

In one embodiment, a communication system includes (i) a Radio Frequency Integrated Circuit (RFIC) comprising a radio transmitter transmitting millimeter-wave signals. The radio transmitter includes a Power Amplifier (PA) outputting the millimeter-wave signals at a low power level of between −10 dBm and 20 dBm, and a Voltage Controlled Oscillator (VCO) and a synthesizer driving a mixer up-converting signals into the millimeter-wave signals, and (ii) a first directional antenna having a gain of at least 30 dBi. The radio transmitter and the first directional antenna are configured to transmit the millimeter-wave signals at a level of at least 20 dBmi, using a bandwidth of at least 100 MHz and 16 QAM, facilitating data rates of at least 200 Mbps, while the RFIC is configured to keep the power consumption of the radio transmitter under 2.5 W. In one embodiment, the VCO and synthesizer have a combined phase noise between a first level and a second level, wherein the first level is high enough to allow inclusion of the VCO and synthesizer in the RFIC, and the second level is low enough to facilitate transmitting at 16-levels Quadrature-Amplitude-Modulation (16 QAM). In one embodiment, the first level high enough to allow inclusion of the VCO and synthesizer in the RFIC is −25 dBc. In one embodiment, the millimeter-wave signals convey a baseband Orthogonal Frequency Division Multiplexing (OFDM) signal having sub-carrier frequency separation equal to X MHz, the combined phase noise is measured by integrating twice a combined phase noise density over a range starting at X MHz above a frequency of a carrier and up to the at least 100 Mhz above the frequency of the carrier, and the second level low enough to facilitate transmitting at 16-levels Quadrature-Amplitude-Modulation (16 QAM) is −15 dBc. In one embodiment, the low power level of the PA allows inclusion of the PA in the RFIC. In one embodiment, the radio transmitter and the first directional antenna are configured to transmit the millimeter-wave signals at a level of at least 20 dBmi, using a bandwidth of at least 500 MHz and 16 QAM, facilitating data rates of at least 1 Gbps. In one embodiment, the radio transmitter and the first directional antenna are configured to transmit the millimeter-wave signals at a level of at least 20 dBmi, using a bandwidth of at least 500 MHz, facilitating data rates of at least 500 Mbps.

BRIEF DESCRIPTION OF THE DRAWINGS

The embodiments are herein described, by way of example only, with reference to the accompanying drawings. No attempt is made to show structural details of the embodiments in more detail than is necessary for a fundamental understanding of the embodiments. In the drawings.

DETAILED DESCRIPTION

Figure 1:
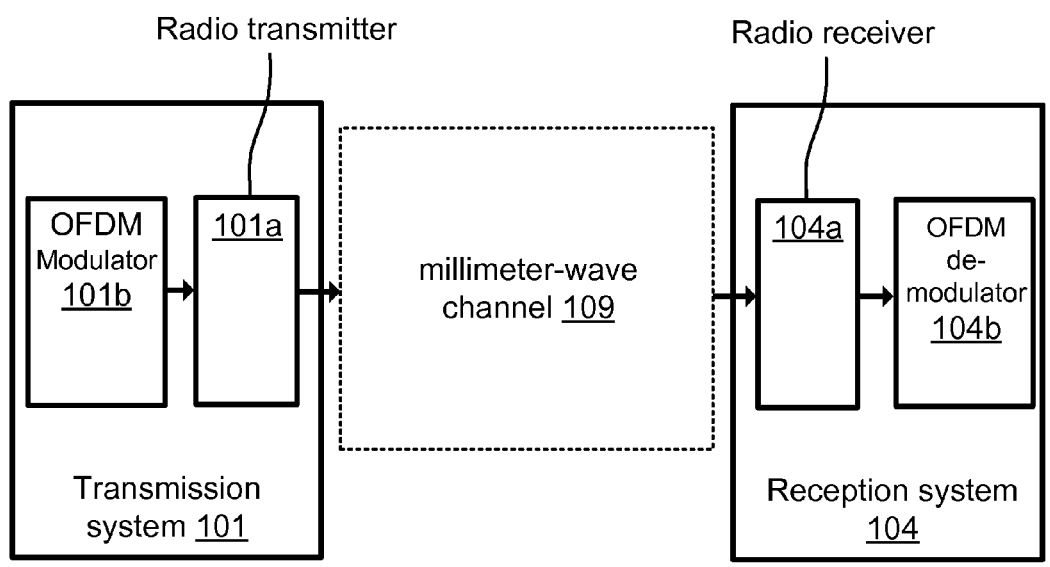
FIG. 1 illustrates one embodiment of a Point-to-Point communication system.

Many Point-to-Point communication systems, typically used for backhauling, have demanding transmission data rate requirements. Achieving transmission data rates in excess of 200 Mbps typically requires the use of radio systems having communication bandwidths in excess of 100 MHz. Such wide-band communication bandwidths affect the frequency response of radio transmitters and receivers, which should be ideally flat. Radio Frequency Integrated Circuit (RFIC) may be used to realize radio transmitters and receivers. Using millimeter-wave Radio Frequency Integrated Circuits to realize Point-to-Point communication systems having communication bandwidths in excess of 100 MHz may result in radio transmitters and receivers having substantially non-flat frequency responses. Millimeter-wave Radio Frequency Integrated Circuits, such as Silicon-Germanium (SiGe) RFIC comprising high frequency Heterojunction Bipolar Transistors (HBT), operating at a bandwidths of over 100 MHz, may have a transmission frequency response variation of at least 4 dB across a 100 MHz transmission bandwidth. This variation needs to be compensated in order to achieve high data transmission rates. In one embodiment, the variation of at least 4 dB is compensated using Orthogonal Frequency Division Multiplexing (OFDM) by both the transmitters and receivers of highly directional millimeter-wave Point-to-Point links. Compensating with OFDM for fluctuations in transmission frequency response occurring in millimeter-wave Radio Frequency Integrated Circuits operating at bandwidths above 100 Mhz is unknown for highly directional millimeter-wave Point-to-Point links, which have a flat channel response and do not require using OFDM to compensate for channel response fluctuations.

In one embodiment, A Point-to-Point communication system includes (i) a millimeter-wave channel having a substantially flat channel transfer function between a first frequency of millimeter-waves and a second frequency of millimeter-waves, the two frequencies are separated by at least 500 MHz, (ii) a transmission system comprising an Orthogonal Frequency Division Multiplexing (OFDM) modulator outputting an OFDM signal having a bandwidth of at least 100 MHz, and a radio transmitter having a substantially non-flat transmission transfer function over the bandwidth of the OFDM signal, up-converting the OFDM signal into a millimeter-wave signal located between the first frequency and the second frequency, and transmitting the millimeter-wave signal via the millimeter-wave channel, and (iii) a reception system comprising a radio receiver having a substantially non-flat reception transfer function over the bandwidth of the OFDM signal, receiving the millimeter-wave signal via the millimeter-wave channel and down-converting the millimeter-wave signal into a reconstruction of the OFDM signal having a bandwidth of at least 100 MHz, and an OFDM de-modulator compensating for the substantially non-flat transmission transfer function and the substantially non-flat reception transfer function, by de-modulating the reconstruction of the OFDM signal.

FIG. 1 illustrates one embodiment of a Point-to-Point communication system. A millimeter-wave channel 109 has a substantially flat channel transfer function between a first frequency of millimeter-waves and a second frequency of millimeter-waves, the two frequencies are separated by at least 500 MHz. A transmission system 101 includes an Orthogonal Frequency Division Multiplexing (OFDM) modulator 101b and a radio transmitter 101a. The OFDM modulator 101b outputs an OFDM signal having a bandwidth of at least 100 MHz. The radio transmitter 101a has a substantially non-flat transmission transfer function over the bandwidth of the OFDM signal. The radio transmitter 101a up-converts the OFDM signal into a millimeter-wave signal located between the first frequency and the second frequency, and transmits the millimeter-wave signal via the millimeter-wave channel 109. A reception system 104 includes a radio receiver 104a and an OFDM de-modulator 104b. The radio receiver 104a has a substantially non-flat reception transfer function over the bandwidth of the OFDM signal. The radio receiver 104a receives the millimeter-wave signal via the millimeter-wave channel 109 and down-converts the millimeter-wave signal into a reconstruction of the OFDM signal having a bandwidth of at least 100 MHz. The OFDM de-modulator 104b compensates for the substantially non-flat transmission transfer function and the substantially non-flat reception transfer function, by de-modulating the reconstruction of the OFDM signal.

Figure 2A:
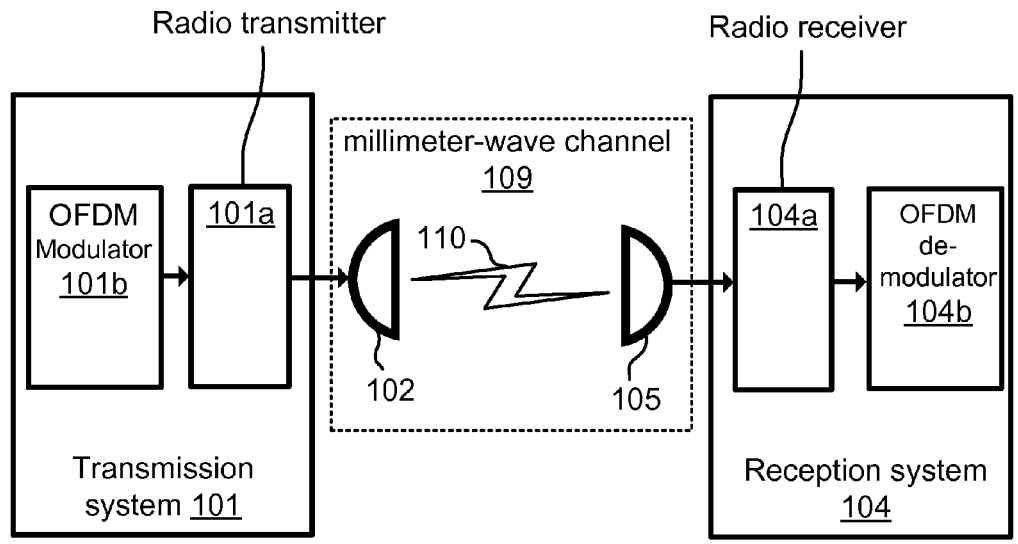
FIG. 2A illustrates one embodiment of a wireless Point-to-Point communication system.

FIG. 2A illustrates one embodiment of a wireless Point-to-Point communication system. The millimeter-wave channel 109 is a wireless channel 110 comprising a first directional antenna 102 through which the millimeter-wave signal is transmitted, and a second directional antenna 105 through which the millimeter-wave signal is received, and the combined gain of the first directional antenna 102 and the second directional antenna 105 is at least 50 dBi, causing the millimeter-wave channel 109 to have the substantially flat channel transfer function between the first frequency and the second frequency.

Figure 2B:
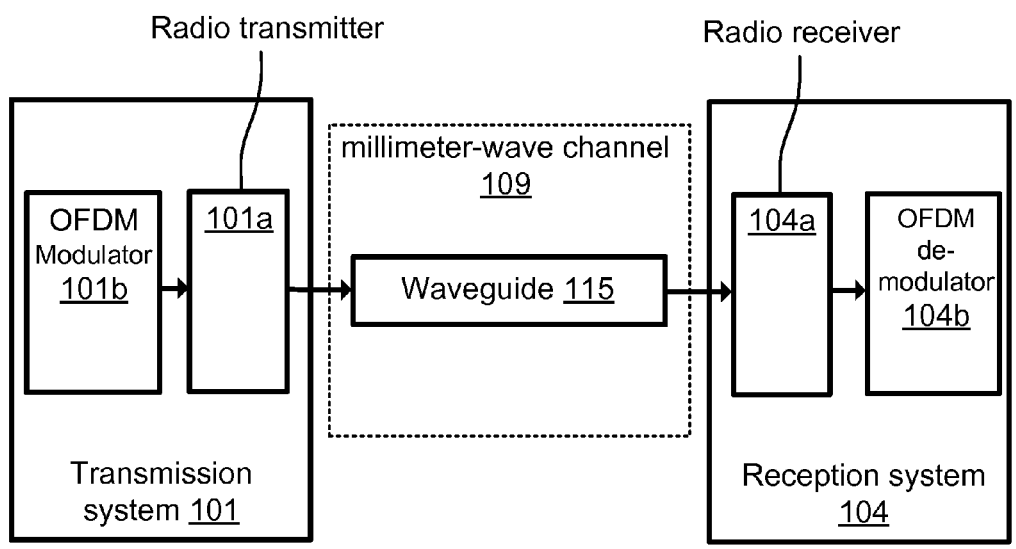
FIG. 2B illustrates one embodiment of a waveguide-based Point-to-Point communication system.

FIG. 2B illustrates one embodiment of a waveguide-based Point-to-Point communication system. The millimeter-wave channel 109 is a waveguide 115 through which the millimeter-wave signal is transmitted. The waveguide 115 has a substantially flat channel transfer function between the first frequency and the second frequency.

In one embodiment, the substantially flat channel transfer function of the millimeter-wave channel is flat to a degree that substantially does not require the use of an OFDM modulator and an OFDM de-modulator to facilitate communication over the millimeter-wave channel. OFDM is typically used to facilitate communication over channels that have a substantially non-flat channel transfer function. Different tones of OFDM signal, also referred to as sub-carriers, are independently de-modulated by an OFDM receiver after being transmitted over a channel having a substantially non-flat channel transfer function. The act of independently de-modulating the tones results in an inherent immunity to variation in frequency responses associated with the channel having a substantially non-flat channel transfer function. This immunity is essentially not required if the channel has a substantially flat channel transfer function. A typical channel having a substantially non-flat channel transfer function may be a wireless channel formed between a transmitter and a receiver both located indoors. The wireless channel suffers from indoor multi-path reflections causing the wireless channel to have a substantially non-flat channel transfer function. According to one example, the substantially flat channel transfer function of the millimeter-wave channel is achieved using directional antennas 102, 105. The directional antennas 102, 105 eliminate multi-path reflections. Typically, directional antennas 102, 105 are used in Point-to-Point communication systems. A Point-to-Point communication system having antennas 102, 105 does not require the use of OFDM in order to compensate for multi-path reflections.

In one embodiment, the second millimeter wave frequency is between 50 GHz and 100 GHz. In one embodiment, the first millimeter wave frequency is above 57 GHz, and the second millimeter-wave frequency is below 86 GHz. In one embodiment, the OFDM signal having a bandwidth of at least 100 MHz is used to transmit data over the millimeter-wave channel at a rate of over 100 Mbps. In one embodiment, the OFDM signal having a bandwidth of at least 100 MHz has a bandwidth of at least 200 MHz, and is used to transmit data over the millimeter-wave channel at a rate of over 200 Mbps. In one embodiment, the OFDM signal having a bandwidth of at least 100 MHz has a bandwidth of at least 500 MHz, and is used to transmit data over the millimeter-wave channel at a rate of over 500 Mbps.

Figure 3:
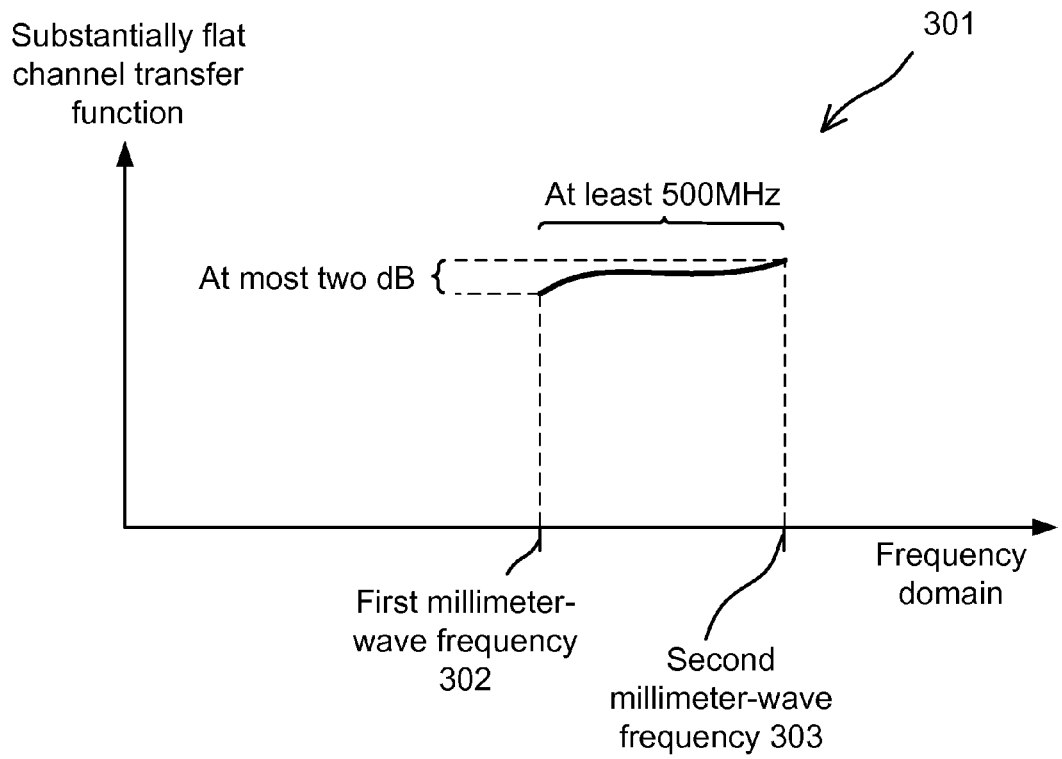
FIG. 3 Illustrates one embodiment of a substantially flat channel transfer function.

FIG. 3 Illustrates one embodiment of the substantially flat channel transfer function. The substantially flat channel transfer function 301 is a transfer function having a difference of at most two dB between the highest magnitude and lowest magnitude of the transfer function in the range between the first frequency and the second frequency. According to one example, the highest magnitude of the substantially flat channel transfer function 301, which occurs by way of example at the second millimeter-wave frequency 303, is −78.5 dB, and the lowest magnitude of the substantially flat channel transfer function 301, which occurs by way of example at the first millimeter-wave frequency 302, is −80 dB. The difference between the highest magnitude and the lowest magnitude is therefore 1.5 dB. It is noted that the highest magnitude can occur at any frequency between the first millimeter-wave frequency 302 and the second millimeter-wave frequency 303. It is noted that the lowest magnitude can occur at any frequency between the first millimeter-wave frequency 302 and the second millimeter-wave frequency 303. According to one example, the first millimeter-wave frequency 302 is 60 GHz and the second millimeter-wave frequency 303 is 60.5 GHz. According to one example, the first millimeter-wave frequency 302 is 70 GHz and the second millimeter-wave frequency 303 is 71 GHz. In one embodiment, the substantially flat channel transfer function 301 is measured from a port of the first directional antenna 102 to a port of the second directional antenna 105, or vice-versa. In one embodiment, the substantially flat channel transfer function 301 is measured from a first port of waveguide 115 to a second port of waveguide 115, or vice-versa.

Figure 4:
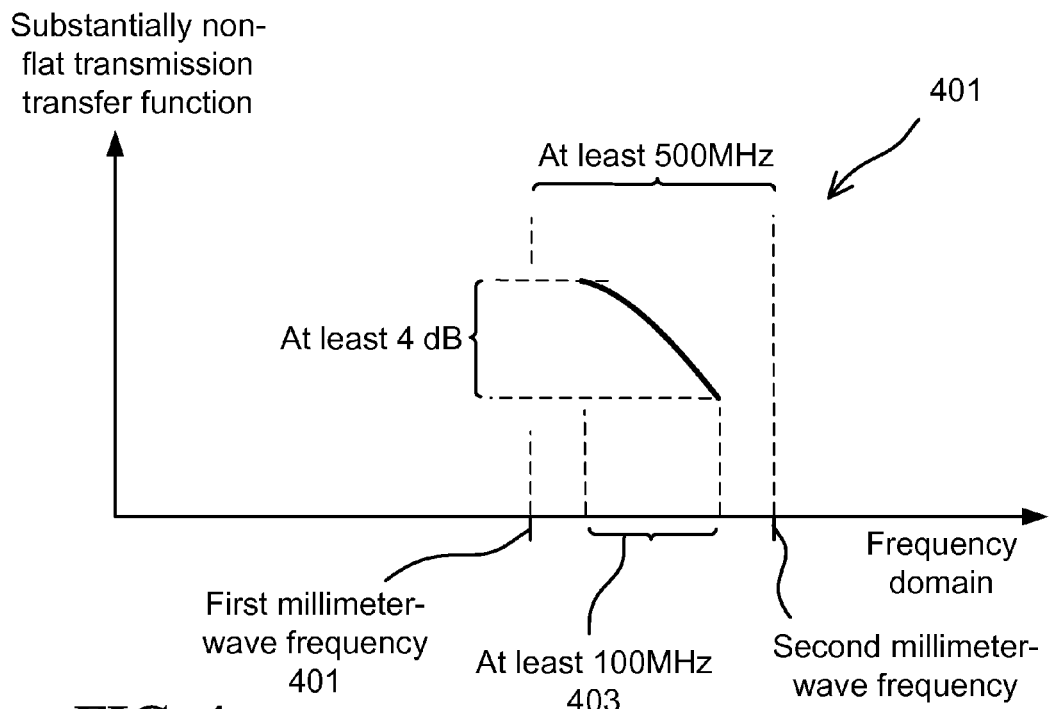
FIG. 4 illustrates one embodiment of a substantially non-flat transmission transfer function.

FIG. 4 illustrates one embodiment of the substantially non-flat transmission transfer function. The substantially non-flat transmission transfer function 401 has a difference of at least 4 dB between the highest magnitude and lowest magnitude of the substantially non-flat transmission transfer function 401, in the range of the at least 100 MHz 403. According to one example, the highest magnitude of the substantially non-flat transmission transfer function 401, which occurs by way of example at the first millimeter-wave frequency 401, is 20 dB, and the lowest magnitude of the substantially flat transmission transfer function 401, which occurs by way of example at the second millimeter-wave frequency 402, is 13 dB. The difference between the highest magnitude and the lowest magnitude is therefore 7 dB. It is noted that the highest magnitude can occur at any frequency between the first millimeter-wave frequency 401 and the second millimeter-wave frequency 402. It is noted that the lowest magnitude can occur at any frequency between the first millimeter-wave frequency 401 and the second millimeter-wave frequency 402. According to one example, the first millimeter-wave frequency 401 is 60 GHz, the second millimeter-wave frequency 402 is 60.5 GHz, and the at least 100 MHz 403 occupied by the OFDM signal transmitted by the radio transmitter 101a is 200 MHz. According to one example, the first millimeter-wave frequency 401 is 70 GHz, the second millimeter-wave frequency 402 is 71 GHz, and the at least 100 MHz 403 occupied by the OFDM signal transmitted by the radio transmitter 101a is 500 MHz.

In one embodiment, the substantially non-flat transmission transfer function 401, or any transmission transfer function related to a radio transmitter such as radio transmitter 101a, is defined as the frequency response of a radio transmitter measured from a Base-Band level of the radio transmitter, to the output of the radio transmitter, taking into account frequency translation occurring during up-conversion of a Base-Band signal into a millimeter-wave signal.

Figure 5:
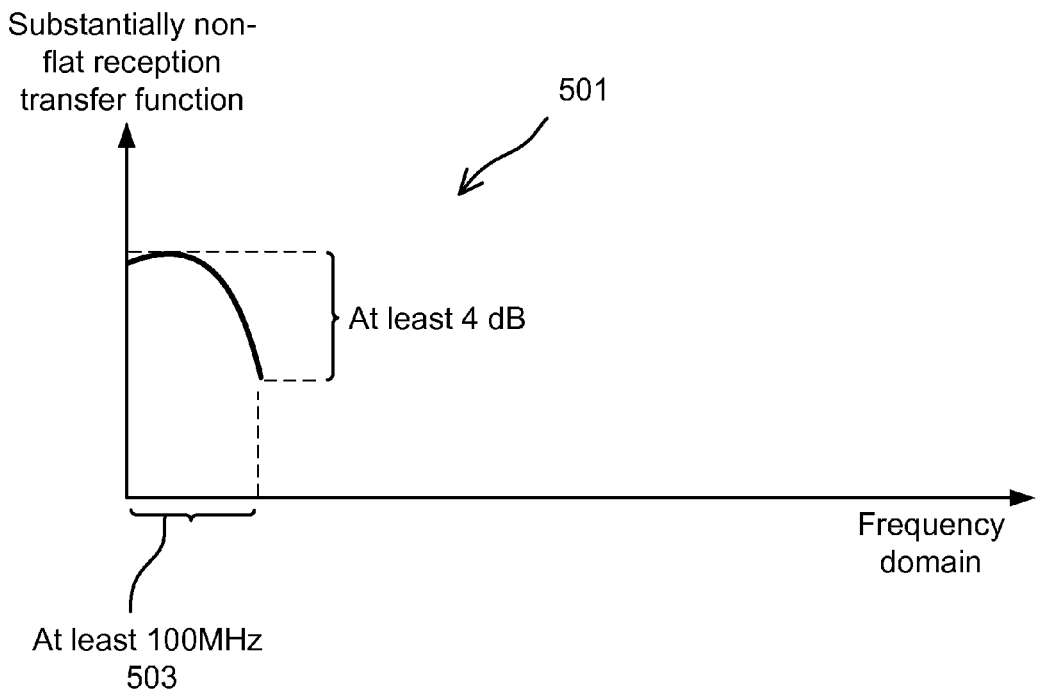
FIG. 5 illustrates one embodiment of a substantially non-flat reception transfer function.

FIG. 5 illustrates one embodiment of the substantially non-flat reception transfer function. The substantially non-flat reception transfer function 501 has a difference of at least 4 dB between the highest magnitude and lowest magnitude of the substantially non-flat reception transfer function 501 in the range of the at least 100 MHz 503. According to one example, the highest magnitude of the substantially non-flat reception transfer function 501, which occurs by way of example close to zero Hz, is 100 dB, and the lowest magnitude of the substantially flat reception transfer function 501, which occurs by way of example at 100 MHz, is 94 dB. The difference between the highest magnitude and the lowest magnitude is therefore 6 dB. It is noted that the highest magnitude can occur at any frequency in the at least 100 MHz 503. It is noted that the lowest magnitude can occur at any frequency in the least 100 MHz 503.

In one embodiment, the substantially non-flat reception transfer function 501, or any reception transfer function related to a radio receiver such as radio receiver 104a, is defined as the frequency response of a radio receiver measured from a millimeter-wave input of the radio receiver, to the Base-Band output of the radio receiver, taking into account frequency translation occurring during down-conversion of a millimeter-wave signal into a Base-Band signal.

In one embodiment, the radio transmitter is a Radio Frequency Integrated Circuit (RFIC), having a substantially non-flat transmission transfer function as a result of being an Integrated Circuit. RFIC operating at millimeter-wave bands and operative to transmit OFDM signals having a bandwidth of at least 100 MHz, typically results in a substantially non-flat transmission transfer function. More specifically, Silicon-Germanium (SiGe) RFIC and CMOS RFIC produce large variations in frequency response over bandwidths exceeding 100 MHz. In one embodiment, the radio receiver is a Radio Frequency Integrated Circuit (RFIC), having a substantially non-flat reception transfer function as a result of being an Integrated Circuit.

In one embodiment, a Point-to-Point communication system includes (i) a millimeter-wave channel having a substantially flat channel transfer function between a first frequency of millimeter-waves and a second frequency of millimeter-waves, the two frequencies are separated by at least 500 MHz, (ii) a transmission system comprising an Orthogonal Frequency Division Multiplexing (OFDM) modulator configured to output an OFDM signal having a bandwidth of at least 100 MHz, and a radio transmitter having a transmission transfer function, configured to up-convert the OFDM signal into a millimeter-wave signal located between the first frequency and the second frequency, and to transmit the millimeter-wave signal via the millimeter-wave channel, and (iii) a reception system comprising a radio receiver having a reception transfer function that in combination with the transmission transfer function of the radio transmitter results in a substantially non-flat radio transfer function over the bandwidth of the OFDM signal, the radio receiver configured to receive the millimeter-wave signal via the millimeter-wave channel and down-convert the millimeter-wave signal into a reconstruction of the OFDM signal having a bandwidth of at least 100 MHz, and an OFDM de-modulator configured to compensate for the substantially non-flat radio transfer function, by de-modulating the reconstruction of the OFDM signal.

Figure 6:
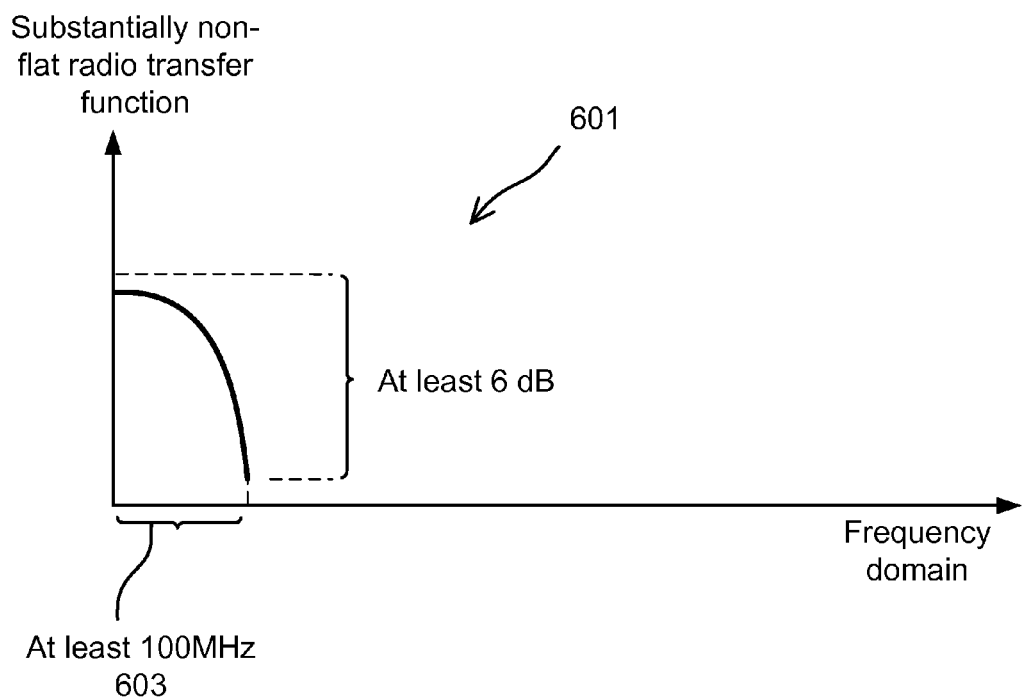
FIG. 6 illustrates one embodiment of a substantially non-flat radio transfer function.
Figure 7A:
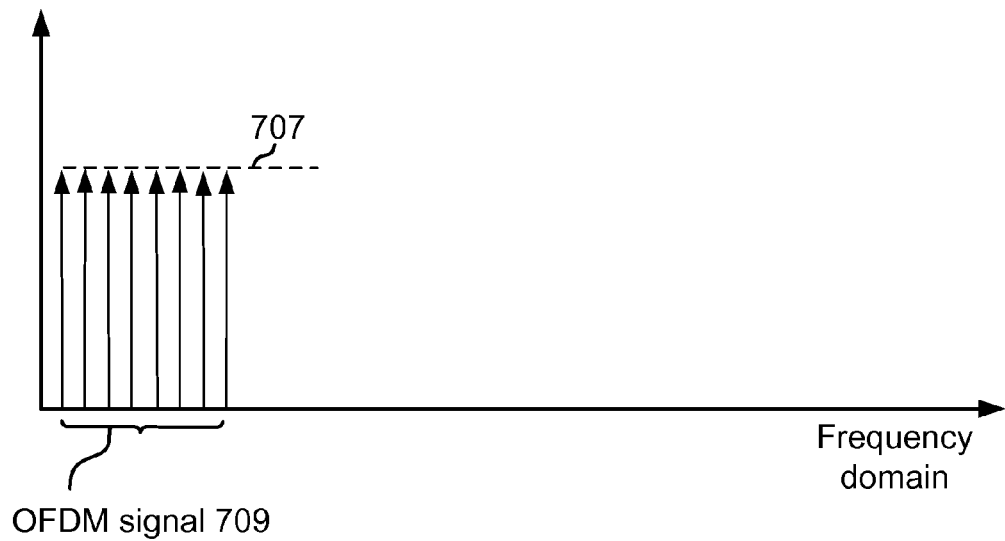
FIG. 7A illustrates one embodiment of OFDM signal propagation through a Point-to-Point communication system.
Figure 7B:
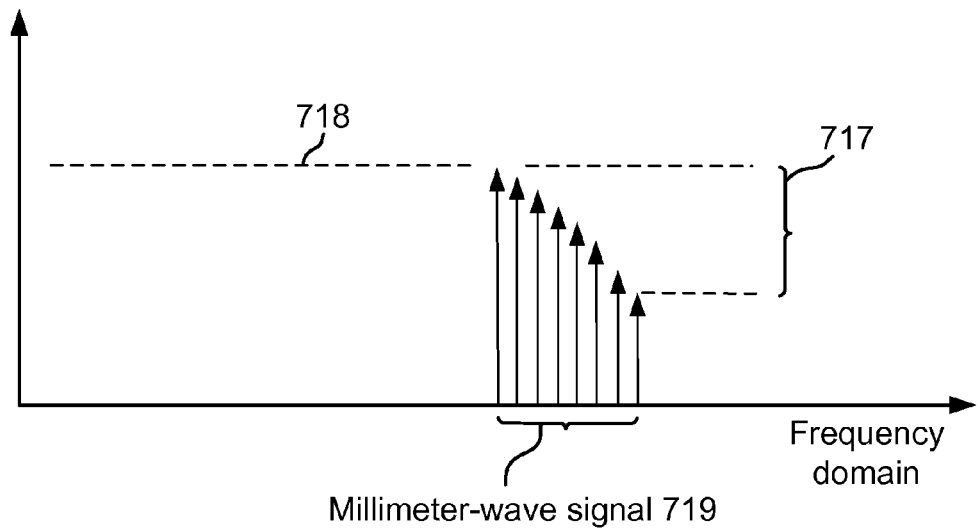
FIG. 7B illustrates one embodiment of OFDM signal propagation through a Point-to-Point communication system.
Figure 7C:
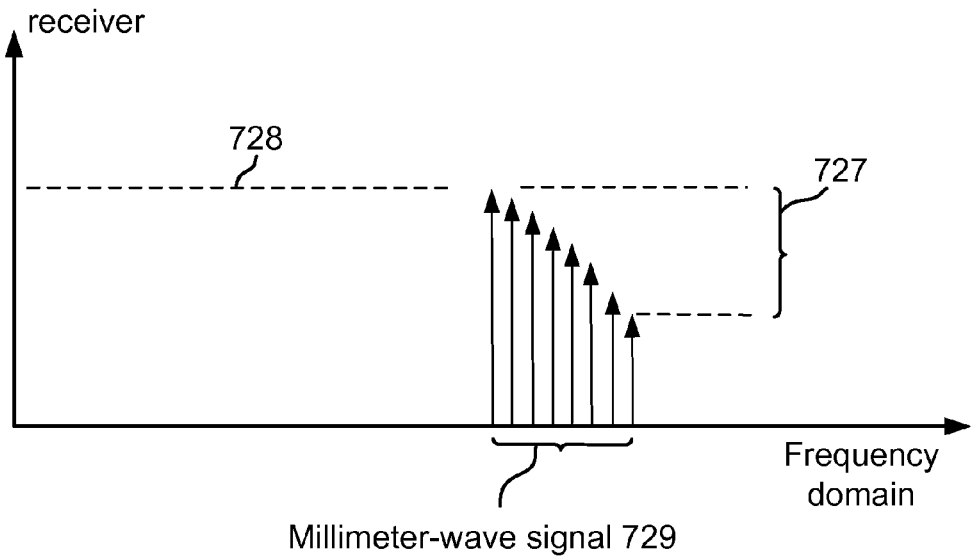
FIG. 7C illustrates one embodiment of OFDM signal propagation through a Point-to-Point communication system.
Figure 7D:
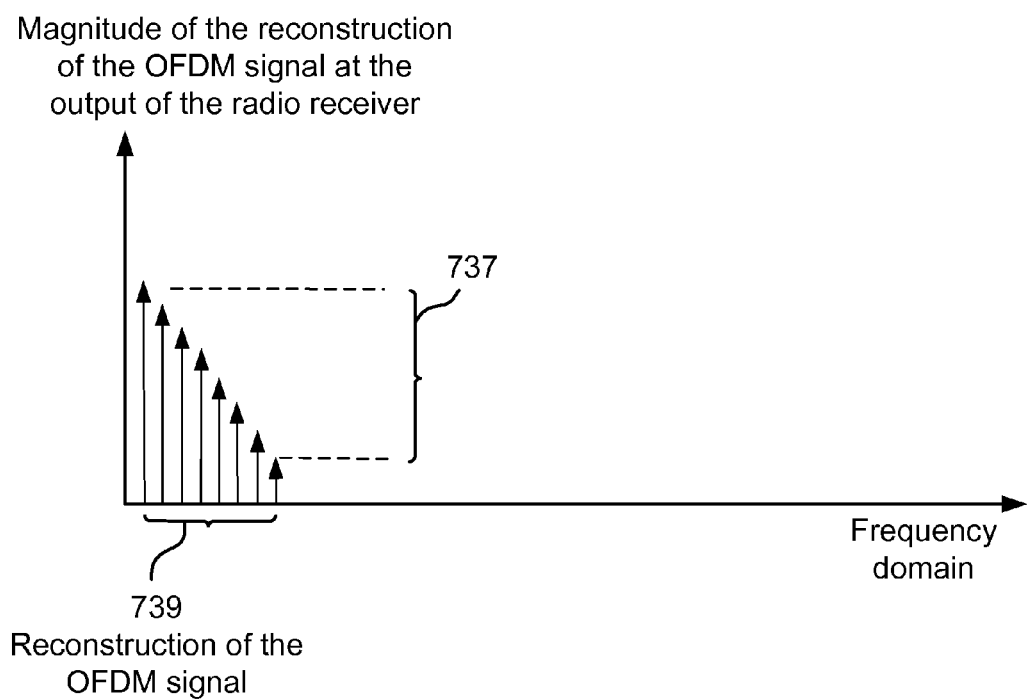
FIG. 7D illustrates one embodiment of OFDM signal propagation through a Point-to-Point communication system.

FIG. 6 illustrates one embodiment of the substantially non-flat radio transfer function. The substantially non-flat radio transfer function 601 has a difference of at least 6 dB between the highest magnitude and lowest magnitude of the substantially non-flat radio transfer function 601 in the range of the at least 100 MHz 603. According to one example, the highest magnitude of the substantially non-flat reception transfer function 601, which occurs by way of example close to zero Hz, is 120 dB, and the lowest magnitude of the substantially flat reception transfer function 501, which occurs by way of example at 100 MHz, is 110 dB. The difference between the highest magnitude and the lowest magnitude is therefore 10 dB. It is noted that the highest magnitude can occur at any frequency in the at least 100 MHz 603. It is noted that the lowest magnitude can occur at any frequency in the least 100 MHz 603.

In one embodiment, the substantially non-flat radio transfer function 601, or any radio transfer function related to a radio receiver and a radio transmitter such as radio receiver 104a and radio transmitter 101a, is defined as the sum of a substantially non-flat transmission transfer function and a substantially non-flat reception transfer function. In one embodiment, the radio transmitter is a Radio Frequency Integrated Circuit (RFIC), and the radio receiver is a RFIC, resulting in a substantially non-flat radio transfer functions.

FIG. 2A, FIG. 7A, FIG. 7B, FIG. 7C, and FIG. 7D illustrate one embodiment of OFDM signal propagation through a Point-to-Point communication system. A millimeter-wave channel 109 has a substantially flat channel transfer function between a first frequency of millimeter-waves and a second frequency of millimeter-waves, the two frequencies are separated by at least 500 MHz. A transmission system 101 includes an Orthogonal Frequency Division Multiplexing (OFDM) modulator 101b and a radio transmitter 101a. The OFDM modulator 101b outputs an OFDM signal 709 having a bandwidth of at least 100 MHz. The OFDM signal 709 comprises 8 tones by way of example. The tones are illustrated as vertical arrows. All the tones are of amplitude 707 by way of example. The radio transmitter 101a has a substantially non-flat transmission transfer function over the bandwidth of the OFDM signal. The radio transmitter 101a up-converts OFDM signal 709 into a millimeter-wave signal 719 located between the first frequency and the second frequency, and transmits the millimeter-wave signal 719 via the millimeter-wave channel 109. A reception system 104 includes a radio receiver 104a and an OFDM de-modulator 104b. The radio receiver 104a has a substantially non-flat reception transfer function over the bandwidth of the OFDM signal. The radio receiver 104a receives the millimeter-wave signal 729 via the millimeter-wave channel 109 and down-converts the millimeter-wave signal 729 into a reconstruction 739 of the OFDM signal having a bandwidth of at least 100 MHz. The OFDM de-modulator 104b compensates for the substantially non-flat transmission transfer function and the substantially non-flat reception transfer function, by de-modulating the reconstruction 739 of the OFDM signal. The 8 tones of millimeter-wave signal 719, illustrated as vertical arrows, are a frequency-translated version of the OFDM signal 709. The 8 tones of millimeter-wave signal 719 have an amplitude variation 717 which is substantially non-zero, and may be 4 dB by way of example. Amplitude variation 717, as well as phase variation not illustrated, are a direct result of the substantially non-flat transmission transfer function of radio transmitter 101a. Power level 718 may be 0 dBm by way of example. The 8 tones of millimeter-wave signal 729, illustrated as vertical arrows, are an attenuated version of millimeter-wave signal 719, wherein the attenuation is the result of millimeter-wave channel 109 including a wireless channel 110. Power level 728 may be −100 dBm by way of example. The 8 tones of millimeter-wave signal 729 have an amplitude variation 727 which is substantially equal to amplitude variation 717. This is a result of millimeter-wave channel 109 having a substantially flat channel transfer function. The 8 tones of the reconstruction 739 of the OFDM signal, illustrated as vertical arrows, are a frequency-translated version of millimeter-wave signal 729. The 8 tones of the reconstruction 739 of the OFDM signal have an amplitude variation 737 which is substantially non-zero, and may be 8 dB by way of example. Amplitude variation 737, as well as phase variation not illustrated, are a direct result of the substantially non-flat reception transfer function of radio receiver 104a and the substantially non-flat transmission transfer function of radio transmitter 101a. It is noted that the amplitude variation 737, as well as phase variation not illustrated, are substantially not a result of the millimeter-wave channel 109, since millimeter-wave channel 109 has a substantially flat channel transfer function. Amplitude variation 737, as well as phase variation not illustrated, are inherently compensated during the course of de-modulating the reconstruction 739 of the OFDM signal by the OFDM de-modulator 104b.

In one embodiment, a Point-to-Point communication system includes (i) a millimeter-wave channel having a substantially flat channel transfer function between a first frequency of millimeter-waves and a second frequency of millimeter-waves, the two frequencies are separated by at least 500 MHz, (ii) a transmission system configured to transmit an Orthogonal Frequency Division Multiplexing (OFDM) signal having a bandwidth of at least 100 MHz over the millimeter-wave channel and between the first frequency and the second frequency, and (iii) a reception system comprising a radio receiver having a substantially non-flat reception transfer function over the bandwidth of the OFDM signal, configured to receive the millimeter-wave signal via the millimeter-wave channel and down-convert the millimeter-wave signal into a reconstruction of the OFDM signal having a bandwidth of at least 100 MHz, and an OFDM de-modulator configured to compensate for the substantially non-flat reception transfer function, by de-modulating the reconstruction of the OFDM signal.

Many Point-to-Point communication systems, typically used for backhauling, have conflicting operational requirements. Ideally, a Point-to-Point communication system is required to transport data at high rates, over long distances, using minimal power consumption. As data rates and distances go up, so does power consumption. A unique integration of several components is required in order to realize a radio transmitter capable of successfully transporting data at rates of several hundred Mega bits per second, over distances of more than 100 meters, using a transmitter consuming less than 2.5 watts of power. In order to get under 2.5 watts of power consumption, a single Radio Frequency Integrated Circuit (RFIC) that comprises all components of a fully functional transmitter must be used. Included in the components are a Power Amplifier (PA), and a Voltage Controlled Oscillator (VCO) with a synthesizer. However, Radio Frequency Integrated Circuits, such as Silicon-Germanium (SiGe) RFIC comprising high frequency Heterojunction Bipolar Transistors (HBT), are incapable of supporting integrated VCO and synthesizer having a combined phase noise good enough to allow using 64-levels Quadrature-Amplitude-Modulation (64 QAM) or 256 QAM, which are needed to achieve data rates of over 200 Mbps using a reasonable amount of spectrum at frequencies typically in use for communication. Therefore, in one embodiment, a VCO and synthesizer supporting only 16 QAM are integrated into the RFIC, while millimeter-wave bands are used in order to get access to large amounts of spectrum. Continuous and usable channels of over 500 MHz are available at frequencies of 57 GHa to 87 GHz. These frequencies, and other frequencies associated with millimeter-waves, are therefore selected. Radio Frequency Integrated Circuits, such as SiGe RFIC comprising high frequency HBT, are also incapable of supporting integrated PA having a millimeter-wave output exceeding power levels usually associated with high bandwidth communication over long distances. In one embodiment, a PA having a reduced power output is therefore integrated into the RFIC. The reduced power PA operates in conjunction with highly directional antennas, which have reasonable sizes at frequencies associated with millimeter-waves. The highly directional antennas compensate for the reduced power PA. The combination of the above elements is able to achieve a set of requirements that is currently considered impossible.

In one embodiment, an ultra-high-bandwidth low-power-consumption wireless communication system includes (i) a Radio Frequency Integrated Circuit (RFIC) comprising a radio transmitter, transmitting millimeter-wave signals. The radio transmitter includes a Power Amplifier (PA) outputting the millimeter-wave signals at a low power level of between −10 dBm and 20 dBm, and by that allowing inclusion of the PA in the RFIC. The radio transmitter further includes a Voltage Controlled Oscillator (VCO) and a synthesizer driving a mixer up-converting signals into the millimeter-wave signals. The VCO and synthesizer have a combined phase noise between a first level and a second level, wherein the first level is high enough to allow inclusion of the VCO and synthesizer in the RFIC, and the second level is low enough to facilitate transmitting at 16-levels Quadrature-Amplitude-Modulation (16 QAM), (ii) a radio receiver receiving the millimeter-wave signals, and (iii) a first directional antenna and a second directional antenna separated by at least 100 meters of line of sight and directed towards each other, together having an aggregated gain of more than 60 dBi, the first directional antenna transmitting the millimeter-wave signals, and the second directional antenna receiving the millimeter-wave signals and feeding the millimeter-wave signals to the radio receiver. The aggregated gain concentrates the low power level of the PA. The radio transmitter and the radio receiver form a millimeter-wave communication link at a bandwidth of at least 100 MHz and 16 QAM, over distances of more than 100 meters, resulting in data transfer rate of at least 200 Mbps, while the RFIC, the first directional antenna, and the second directional antenna keep the power consumption of the radio transmitter under 2.5 W.

Figure 8:
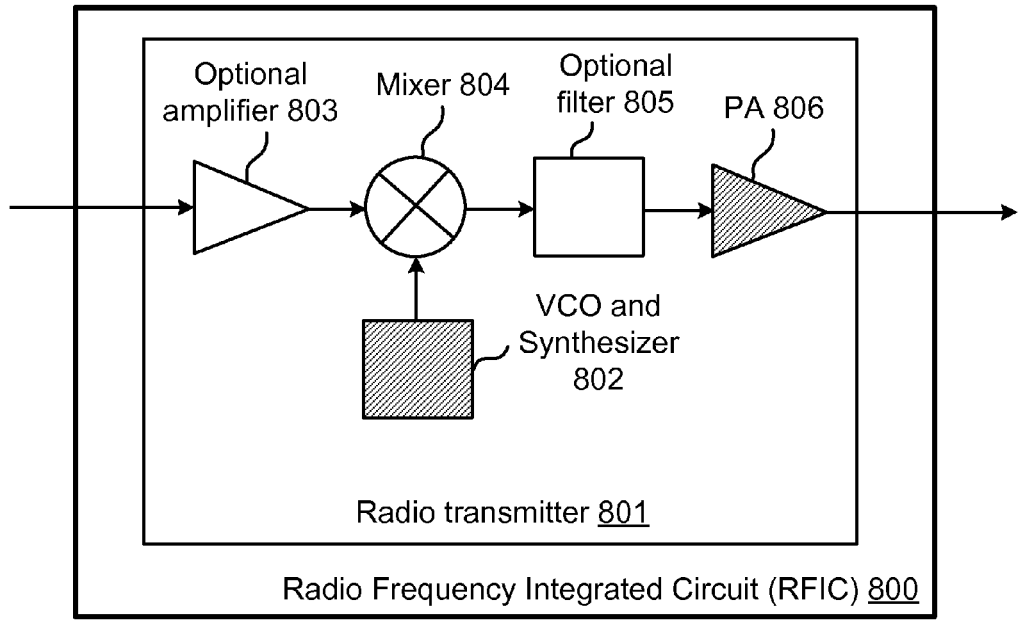
FIG. 8 illustrates one embodiment of a Radio Frequency Integrated Circuit (RFIC) comprising a radio transmitter.

FIG. 8 illustrates one embodiment of a Radio Frequency Integrated Circuit (RFIC) 800 comprising a radio transmitter 801. The radio transmitter 801 includes all components necessary to facilitate a complete radio transmitter design, such as a mixer 804, optionally filters such as filter 805, and optionally amplifiers such as amplifier 803. The radio transmitter 801 includes a Power Amplifier (PA) 806 operative to output a millimeter-wave signals at a low power level of between −10 dBm and 20 dBm. This low power level is low enough to allow integration of the PA 806 inside the RFIC 800, such that a complete radio transmitter design can be facilitated. A VCO and synthesizer 802 drive mixer 804. The mixer 804 is used to generate millimeter wave signals. The VCO and synthesizer 802 have a combined phase noise between a first level and a second level. The first level is high enough to allow integration of the VCO and synthesizer 802 into the RFIC 800. The second level is low enough to facilitate transmitting at 16-levels Quadrature-Amplitude-Modulation (16 QAM).

Figure 9A:
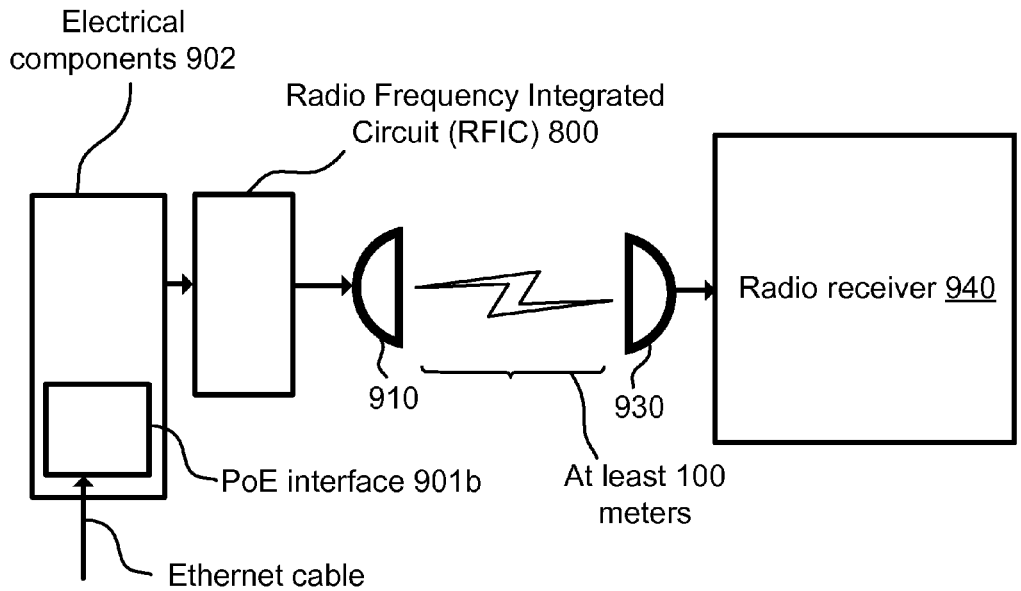
FIG. 9A illustrates one embodiment of a communication system comprising a Radio Frequency Integrated Circuit (RFIC)

FIG. 9A illustrates one embodiment of a communication system. A radio receiver 940 receives the millimeter-wave signals generated by PA 806. A first directional antenna 910 and a second directional antenna 930 are separated by at least 100 meters of line of sight. The first directional antenna 910 and the second directional antenna 930 are directed towards each other, and together have an aggregated gain of more than 60 dBi. The aggregated gain of more than 60 dBi is operative to concentrate the low power level of PA 806, allowing the millimeter-wave signals to better propagate, The first directional antenna 910 transmits the millimeter-wave signals. The second directional antenna receives the millimeter-wave signals, and feeds the millimeter-wave signals to the radio receiver 940. The radio transmitter 801 and the radio receiver 940 form a millimeter-wave communication link at a bandwidth of at least 100 MHz and using 16 QAM, over distances of more than 100 meters, resulting in data transfer rate of at least 200 Mbps. RFIC 800 comprising VCO and synthesizer 802, and PA 806, together with the first directional antenna 910 and the second directional antenna 930, keep the power consumption of the radio transmitter 801 under 2.5 W, while achieving the bandwidth of at least 100 MHz, using 16 QAM, over distances of more than 100 meters, resulting in data transfer rate of at least 200M. It is noted that bandwidth of at least 100 MHz may be found at frequencies belonging to millimeter waves. It is noted that using bandwidth of less than 100 MHz would have required the use of 64 QAM or 256 QAM in order to achieve data transfer rate of at least 200M.

In one embodiment, the millimeter-wave signals are located above 20 GHz. In one embodiment, the millimeter-wave signals are located above 50 GHz. In one embodiment, the millimeter-wave signals are located above 57 GHz. In one embodiment, the radio transmitter 801 and the radio receiver 940 form a millimeter-wave communication link at a bandwidth of at least 200 MHz and 16 QAM, over distances of more than 100 meters, resulting in data transfer rate of at least 400 Mbps.

In one embodiment, the radio transmitter 801 and the radio receiver 940 form a millimeter-wave communication link at a bandwidth of at least 500 MHz and 16 QAM, over distances of more than 100 meters, resulting in data transfer rate of at least 1 Gbps.

In one embodiment, the first level high enough to allow inclusion of the VCO and synthesizer 802 in RFIC 800 is −25 dBc. In one embodiment, the millimeter-wave signals convey a baseband Orthogonal Frequency Division Multiplexing (OFDM) signal having sub-carrier frequency separation equal to X MHz, the combined phase noise is measured by integrating twice a combined phase noise density over a range starting at X MHz above a frequency of a carrier and up to the at least 100 Mhz above the frequency of the carrier, and the second level low enough to facilitate transmitting at 16-levels Quadrature-Amplitude-Modulation (16 QAM) is −15 dBc. The carrier is the output of the VCO and synthesizer 802 driving mixer 804. According to one example, the carrier has a frequency of 70 Ghz, the baseband Orthogonal Frequency Division Multiplexing (OFDM) signal has a sub-carrier frequency separation equal to 2 MHz, the millimeter-wave communication link has a bandwidth of 200 MHz, and the combined phase noise is two times (twice) the integration of a combined phase noise density of the VCO and synthesizer 802 over the range of 70 GHz+2 MHz to 70 GHz+200 MHz, yielding a combined phase noise below −15 dBc.

In one embodiment, the ultra-high-bandwidth low-power-consumption wireless communication system further includes electrical components 902 comprising a network enabled processor, a modulator, and a Power Over Ethernet (PoE) interface 901b. The a Power Over Ethernet (PoE) interface 901b is operative to deliver power to the RFIC 800 and the electrical components 902. In one embodiment, the electrical components 902 have a power consumption of under 23 W, such that the aggregated power consumption of the RFIC 800 and the electrical components is under 25.5 W. This may optionally allow using a high power range of the PoE standard. In one embodiment, the electrical components 902 have a power consumption of under 10.45 W, such that the aggregated power consumption of the RFIC 800 and the electrical components 902 is under 12.95 W. This may optionally allow using a mid power range of the PoE standard. In one embodiment, the electrical components 902 have a power consumption of under 3.99 W, such that the aggregated power consumption of the RFIC 800 and the electrical components 902 is under 6.49 W. This may optionally allow using a low power range of the PoE standard.

Figure 9B:
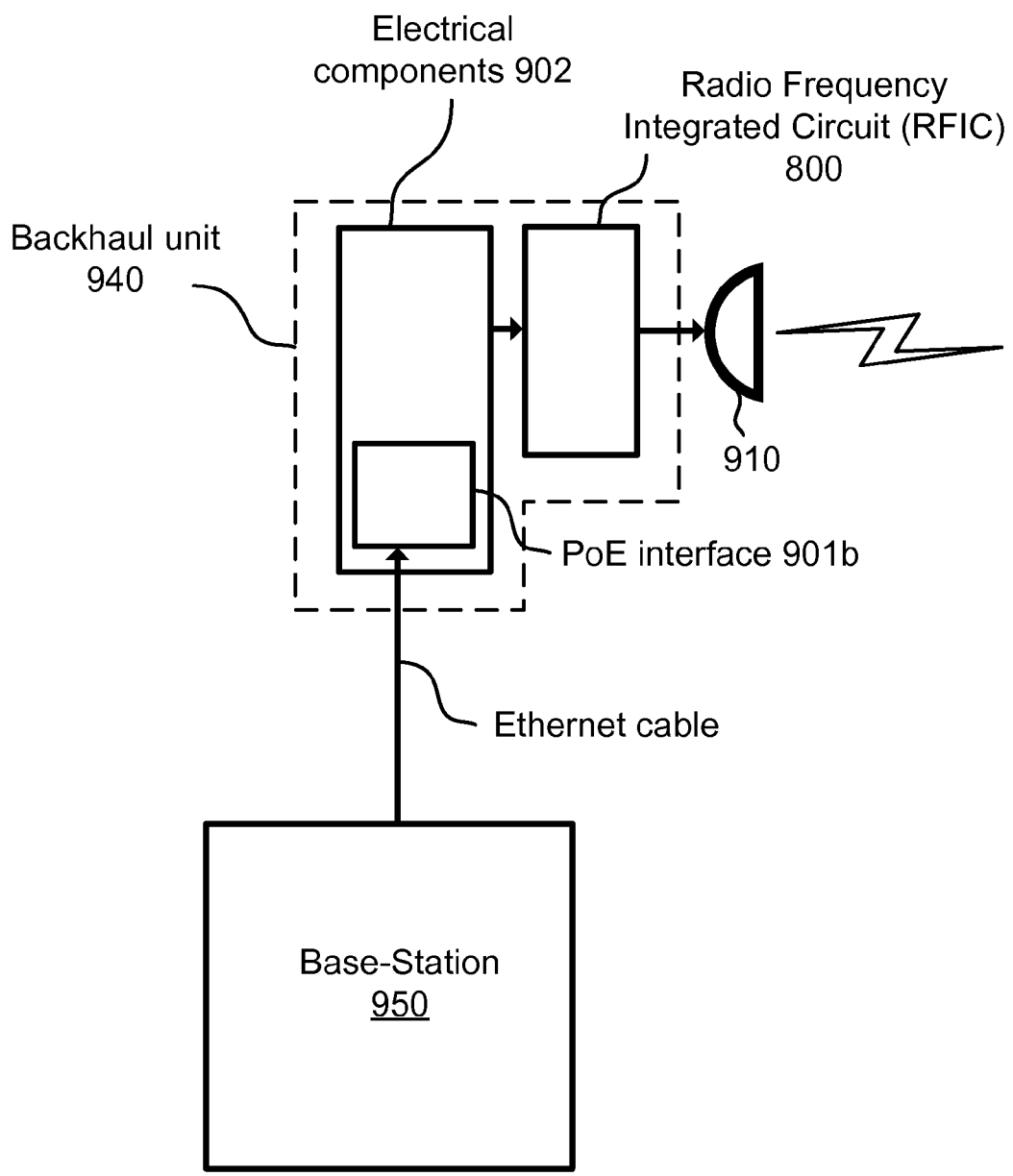
FIG. 9B illustrates one embodiment of a communication system comprising a Radio Frequency Integrated Circuit (RFIC) and a Base-Station.

FIG. 9B illustrates one embodiment of a communication system. Optionally, the ultra-high-bandwidth low-power-consumption wireless communication system further includes a backhaul unit 940 comprising the electrical components 902 and the RFIC 800. The electrical components 902 include the Power Over Ethernet (PoE) interface 901b. The PoE interface 901b is operative to deliver power to the RFIC 800 and the electrical components 902. Optionally, a Base-Station 950 belonging to a Radio Access Network (RAN) drives the PoE interface 901b, and deliver power to the backhaul unit 940. In one embodiment, the RFIC is a Silicon-Germanium (SiGe) RFIC comprising high frequency Heterojunction Bipolar Transistors (HBT). In one embodiment, the RFIC is a CMOS RFIC.

In one embodiment, Power Amplifier (PA) 806 outputs the millimeter-wave signals at a low power level of between −10 dBm and 0 dBm The radio transmitter and the radio receiver form a millimeter-wave communication link at a bandwidth of at least 100 MHz and 16 QAM, over distances of more than 50 meters, resulting in data transfer rate of at least 200 Mbps, while the RFIC, the first directional antenna, and the second directional antenna keep the power consumption of the radio transmitter under 1.5 W.

In one embodiment, the first directional antenna 910 and the second directional antenna 930 are directed towards each other, and together have an aggregated gain of more than 80 dBi. Power Amplifier (PA) 806 outputs the millimeter-wave signals at a low power level of between −10 dBm and 0 dBm The radio transmitter and the radio receiver form a millimeter-wave communication link at a bandwidth of at least 100 MHz and 16 QAM, over distances of more than 100 meters, resulting in data transfer rate of at least 200 Mbps, while the RFIC, the first directional antenna, and the second directional antenna keep the power consumption of the radio transmitter under 1.5 W.

In one embodiment, the first directional antenna 910 and the second directional antenna 930 are directed towards each other, and together have an aggregated gain of more than 80 dBi. Power Amplifier (PA) 806 outputs the millimeter-wave signals at a low power level of between −10 dBm and 0 dBm. The radio transmitter and the radio receiver form a millimeter-wave communication link at a bandwidth of at least 100 MHz and 16 QAM, over distances of more than 50 meters, resulting in data transfer rate of at least 200 Mbps, while the RFIC, the first directional antenna, and the second directional antenna keep the power consumption of the radio transmitter under 1 W.

Figure 9C:
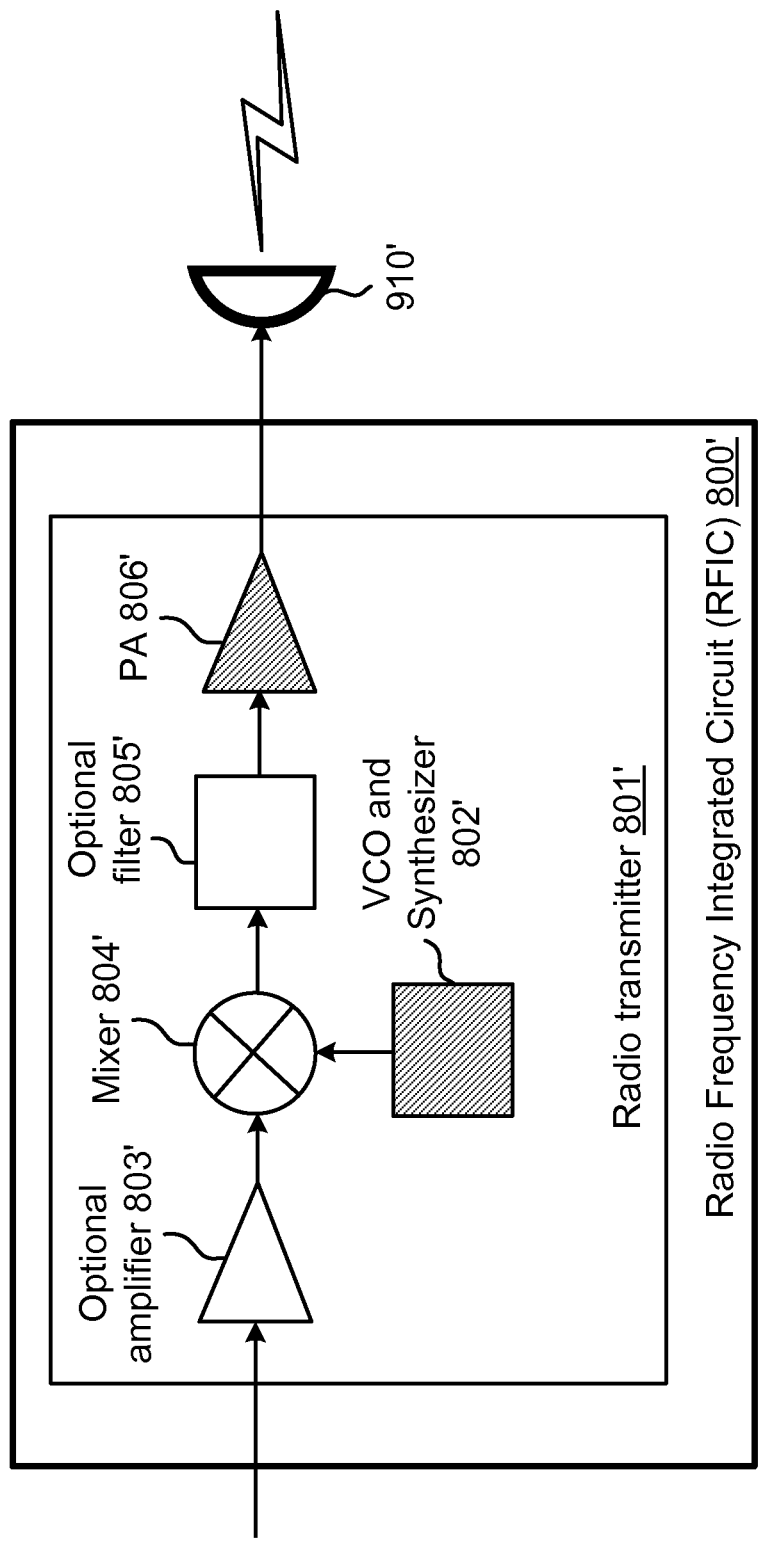
FIG. 9C illustrates one embodiment of a communication system comprising a Radio Frequency Integrated Circuit (RFIC) and a directional antenna.

FIG. 9C illustrates one embodiment of a communication system. The communication system includes (i) a RFIC 800' comprising a radio transmitter 801' transmitting millimeter-wave signals. The radio transmitter 801' includes a PA 806' outputting the millimeter-wave signals at a low power level of between −10 dBm and 20 dBm, and a VCO and a synthesizer 802' driving a mixer 804' up-converting signals into the millimeter-wave signals, and (ii) a first directional antenna 910' having a gain of at least 30 dBi. The radio transmitter 801' and the first directional antenna 910' are configured to transmit the millimeter-wave signals at a level of at least 20 dBmi, using a bandwidth of at least 100 MHz and 16 QAM, facilitating data rates of at least 200 Mbps, while the RFIC 800' is configured to keep the power consumption of the radio transmitter 801' under 2.5 W. It is noted that although PA 806' is illustrated as being directly connected to directional antenna 910', PA 806' may also be indirectly connected to directional antenna 910', via a filter or a power splitter, or via any other appropriate component.

In one embodiment, the VCO and synthesizer 802' have a combined phase noise between a first level and a second level, wherein the first level is high enough to allow inclusion of the VCO and synthesizer 802' in the RFIC 800', and the second level is low enough to facilitate transmitting at 16-levels Quadrature-Amplitude-Modulation (16 QAM). In one embodiment, the first level high enough to allow inclusion of the VCO and synthesizer 802' in the RFIC 800' is −25 dBc.

In one embodiment, the millimeter-wave signals convey a baseband Orthogonal Frequency Division Multiplexing (OFDM) signal having sub-carrier frequency separation equal to X MHz, the combined phase noise is measured by integrating twice a combined phase noise density over a range starting at X MHz above a frequency of a carrier and up to the at least 100 Mhz above the frequency of the carrier, and the second level low enough to facilitate transmitting at 16-levels Quadrature-Amplitude-Modulation (16 QAM) is −15 dBc. In one embodiment, the low power level of PA 806' allows inclusion of PA 806' in the RFIC 800'. In one embodiment, the radio transmitter 801' and the first directional antenna 910' are configured to transmit the millimeter-wave signals at a level of at least 20 dBmi, using a bandwidth of at least 500 MHz and 16 QAM, facilitating data rates of at least 1 Gbps. In one embodiment, the radio transmitter 801' and the first directional antenna 910' are configured to transmit the millimeter-wave signals at a level of at least 20 dBmi, using a bandwidth of at least 500 MHz, facilitating data rates of at least 500 Mbps.

In this description, numerous specific details are set forth. However, the embodiments of the invention may be practiced without some of these specific details. In other instances, well known hardware, software, materials, structures and techniques have not been shown in detail in order not to obscure the understanding of this description. In this description, references to "one embodiment" mean that the feature being referred to may be included in at least one embodiment of the invention. Moreover, separate references to "one embodiment" or "some embodiments" in this description do not necessarily refer to the same embodiment. Illustrated embodiments are not mutually exclusive, unless so stated and except as will be readily apparent to those of ordinary skill in the art. Thus, the invention may include any variety of combinations and/or integrations of the features of the embodiments described herein. Although some embodiments may depict serial operations, the embodiments may perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. The embodiments are not limited in their applications to the details of the order or sequence of steps of operation of methods, or to details of implementation of devices, set in the description, drawings, or examples. Moreover, individual blocks illustrated in the figures may be functional in nature and do not necessarily correspond to discrete hardware elements. While the methods disclosed herein have been described and shown with reference to particular steps performed in a particular order, it is understood that these steps may be combined, sub-divided, or reordered to form an equivalent method without departing from the teachings of the embodiments. Accordingly, unless specifically indicated herein, the order and grouping of the steps is not a limitation of the embodiments. Furthermore, methods and mechanisms of the embodiments will sometimes be described in singular form for clarity. However, some embodiments may include multiple iterations of a method or multiple instantiations of a mechanism unless noted otherwise. For example, when an interface is disclosed in an embodiment, the scope of the embodiment is intended to also cover the use of multiple interfaces. Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications and variations will be apparent to those skilled in the art. It is to be understood that other embodiments may be utilized and structural changes may be made without departing from the scope of the embodiments. Accordingly, it is intended to embrace all such alternatives, modifications and variations that fall within the spirit and scope of the appended claims and their equivalents.

What is claimed is:

1. An ultra-high-bandwidth low-power-consumption wireless communication system, comprising:
   a Radio Frequency Integrated Circuit (RFIC) comprising a radio transmitter, operative to transmit millimeter-wave signals, the radio transmitter comprising a Power Amplifier (PA) operative to output the millimeter-wave signals at a low power level of between −10 dBm and 20 dBm allowing inclusion of the PA in the RFIC, and a Voltage Controlled Oscillator (VCO) and synthesizer operative to drive a mixer up-converting signals into the millimeter-wave signals, the VCO and synthesizer having a combined phase noise between a first level and a second level, wherein the first level is above −25 dBc integrated over frequency from 100 Hz to 10 MHz to allow inclusion of the VCO and synthesizer in the RFIC, and the second level is below −15 dBc to facilitate transmitting at 16-levels Quadrature-Amplitude-Modulation (16 QAM);
   a radio receiver configured to receive the millimeter-wave signals; and
   a first directional antenna and a second directional antenna separated by at least 100 meters of line of sight and directed towards each other, together having an aggregated gain of more than 60 dBi, the first directional antenna configured to transmit the millimeter-wave signals, and the second directional antenna configured to receive the millimeter-wave signals and feed the millimeter-wave signals to the radio receiver, and the aggregated gain is operative to concentrate the low power level of the PA;

wherein the radio transmitter and the radio receiver are configured to form a millimeter-wave communication link at a bandwidth of at least 100 MHz and using 16 QAM, over distances of more than 100 meters, resulting in data transfer rate of at least 200 Mbps, while the RFIC, the first directional antenna, and the second directional antenna, are configured to keep power consumption of the radio transmitter under 2.5 W.

2. The system of claim 1, wherein the millimeter-wave signals are located above 20 GHz.

3. The system of claim 1, wherein the millimeter-wave signals are located above 50 GHz.

4. The system of claim 1, wherein the millimeter-wave signals are located above 57 GHz.

5. The system of claim 1, wherein the radio transmitter and the radio receiver are configured to form a millimeter-wave communication link at a bandwidth of at least 200 MHz and 16 QAM, over distances of more than 100 meters, resulting in data transfer rate of at least 400 Mbps.

6. The system of claim 1, wherein the radio transmitter and the radio receiver are configured to form a millimeter-wave communication link at a bandwidth of at least 500 MHz and 16 QAM, over distances of more than 100 meters, resulting in data transfer rate of at least 1 Gbps.

7. The system of claim 1, wherein the first level high enough to allow inclusion of the VCO and synthesizer in the RFIC is −25 dBc.

8. The system of claim 1, wherein the millimeter-wave signals convey a baseband Orthogonal Frequency Division Multiplexing (OFDM) signal having sub-carrier frequency separation equal to X MHz, the combined phase noise is measured by integrating twice a combined phase noise density over a range starting at X MHz above a frequency of a carrier and up to the at least 100 Mhz above the frequency of the carrier, and the second level low enough to facilitate transmitting at 16-levels Quadrature-Amplitude-Modulation (16 QAM) is −15 dBc.

9. The system of claim 1, further comprising:
electrical components comprising a network enabled processor, a modulator, and a Power Over Ethernet (PoE) interface;
the PoE interface is configured to deliver power to the RFIC and the electrical components;
wherein the electrical components have a power consumption of under 23 W, such that the aggregated power consumption of the RFIC and the electrical components is under 25.5 W.

10. The system of claim 1, further comprising:
electrical components comprising a network enabled processor, a modulator, and a Power Over Ethernet (PoE) interface;
the PoE interface is configured to deliver power to the RFIC and the electrical components;
wherein the electrical components have a power consumption of under 10.45 W, such that the aggregated power consumption of the RFIC and the electrical components is under 12.95 W.

11. The system of claim 1, further comprising:
electrical components comprising a network enabled processor, a modulator, and a Power Over Ethernet (PoE) interface;
the PoE interface is configured to deliver power to the RFIC and the electrical components;
wherein the electrical components have a power consumption of under 3.99 W, such that the aggregated power consumption of the RFIC and the electrical components is under 6.49 W.

12. The system of claim 1, further comprising:
a backhaul unit comprising electrical components and the RFIC;
the electrical components comprising a Power Over Ethernet (PoE) interface, the PoE interface is configured to deliver power to the RFIC and the electrical components; and
a Base-Station belonging to a Radio Access Network (RAN), the Base-Station is configured to drive the PoE interface.

13. The system of claim 1, wherein the RFIC is a Silicon-Germanium (SiGe) RFIC comprising high frequency Heterojunction Bipolar Transistors (HBT).

14. The system of claim 1, wherein the RFIC is a CMOS RFIC.

15. A communication system, comprising:
a Radio Frequency Integrated Circuit (RFIC) comprising a radio transmitter, operative to transmit millimeter-wave signals, the radio transmitter comprising a Power Amplifier (PA) operative to output the millimeter-wave signals at a low power level of between −10 dBm and 20 dBm, and a Voltage Controlled Oscillator (VCO) and a synthesizer operative to drive a mixer up-converting signals into the millimeter-wave signals; and
a first directional antenna having a gain of at least 30 dBi;
wherein the radio transmitter and the first directional antenna are configured to transmit the millimeter-wave signals at a level of at least 20 dBmi, using a bandwidth of at least 100MHz and 16 -levels Quadrature-Amplitude-Modulation (16 QAM), facilitating data rates of at least 200 Mbps, while the RFIC is configured to keep power consumption of the radio transmitter under 2.5W.

16. The system of claim 15, wherein the VCO and synthesizer have a combined phase noise between a first level and a second level, wherein the first level is above −25 dBc integrated over frequency from 100Hz to 10 MHz to allow inclusion of the VCO and synthesizer in the RFIC, and the second level is below −15 dBc to facilitate transmitting at 16-levels Quadrature-Amplitude-Modulation (16 QAM).

17. The system of claim 16, wherein the first level high enough to allow inclusion of the VCO and synthesizer in the RFIC is −25 dBc.

18. The system of claim 16, wherein the millimeter-wave signals convey a baseband Orthogonal Frequency Division Multiplexing (OFDM) signal having sub-carrier frequency separation equal to X MHz, the combined phase noise is measured by integrating twice a combined phase noise density over a range starting at X MHz above a frequency of a carrier and up to the at least 100 Mhz above the frequency of the carrier, and the second level low enough to facilitate transmitting at 16-levels Quadrature-Amplitude-Modulation (16 QAM) is −15 dBc.

19. The system of claim 15, wherein the low power level of the PA allows inclusion of the PA in the RFIC.

20. The system of claim 15, wherein the radio transmitter and the first directional antenna are configured to transmit the millimeter-wave signals at a level of at least 20 dBmi, using a bandwidth of at least 500 MHz and 16 QAM, facilitating data rates of at least 1 Gbps.

21. The system of claim 15, wherein the radio transmitter and the first directional antenna are configured to transmit the millimeter-wave signals at a level of at least 20 dBmi, using a bandwidth of at least 500 MHz, facilitating data rates of at least 500 Mbps.

22. The system of claim 15, further comprising:
electrical components comprising a network enabled processor, a modulator, and a Power Over Ethernet (PoE) interface;
the PoE interface is configured to deliver power to the RFIC and the electrical components;
wherein the electrical components have a power consumption of under 23 W, such that the aggregated power consumption of the RFIC and the electrical components is under 25.5 W.

23. The system of claim 15, further comprising:
electrical components comprising a network enabled processor, a modulator, and a Power Over Ethernet (PoE) interface;
the PoE interface is configured to deliver power to the RFIC and the electrical components;
wherein the electrical components have a power consumption of under 10.45 W, such that the aggregated power consumption of the RFIC and the electrical components is under 12.95 W.

24. The system of claim 15, further comprising:
electrical components comprising a network enabled processor, a modulator, and a Power Over Ethernet (PoE) interface;
the PoE interface is configured to deliver power to the RFIC and the electrical components;
wherein the electrical components have a power consumption of under 3.99 W, such that the aggregated power consumption of the RFIC and the electrical components is under 6.49 W.

25. The system of claim 15, further comprising:
a backhaul unit comprising electrical components and the RFIC;
the electrical components comprising a Power Over Ethernet (PoE) interface, the PoE interface is configured to deliver power to the RFIC and the electrical components; and
a Base-Station belonging to a Radio Access Network (RAN), the Base-Station is configured to drive the PoE interface.

26. The system of claim 15, wherein the RFIC is a Silicon-Germanium (SiGe) RFIC comprising high frequency Heterojunction Bipolar Transistors (HBT).

27. The system of claim 15, wherein the RFIC is a CMOS RFIC.

* * * * *